United States Patent [19]
McVerry

[11] Patent Number: 6,002,684
[45] Date of Patent: Dec. 14, 1999

[54] METHOD AND SYSTEM FOR ACHIEVING FASTER ASYMMETRIC DATA TRANSMISSION THROUGH THE PUBLIC SWITCHED TELEPHONE NETWORK

[75] Inventor: Francis McVerry, Rancho Santa Margarita, Calif.

[73] Assignee: Conexant Systems, Inc., Newport Beach, Calif.

[21] Appl. No.: 08/892,446

[22] Filed: Jul. 14, 1997

[51] Int. Cl.⁶ .............................. H04L 12/50; H04M 1/00
[52] U.S. Cl. ............................................. 370/359; 379/399
[58] Field of Search .................................... 370/264, 524, 370/359, 360, 463, 351, 357; 379/399, 398, 394, 413

[56] References Cited

U.S. PATENT DOCUMENTS

| | | | |
|---|---|---|---|
| 4,985,891 | 1/1991 | Fujiwara et al. | 370/110.1 |
| 5,305,312 | 4/1994 | Fornek et al. | 370/110.1 |
| 5,459,788 | 10/1995 | Kim | 379/399 |
| 5,577,115 | 11/1996 | Deutsch | 379/399 |
| 5,598,401 | 1/1997 | Blackwell et al. | 379/94 |
| 5,825,829 | 10/1998 | Borazjani et al. | 375/308 |

*Primary Examiner*—Ajit Patel
*Assistant Examiner*—Brian Nguyen
*Attorney, Agent, or Firm*—Snell & Wilmer L.L.P.

[57] ABSTRACT

The present invention comprises a smart subscriber line interface card (SLIC). The SLIC of the present invention includes a switch coupled to a data transmitter, a DAC (digital to analog converter), and a controller circuit. The data transmitter is coupled to a first input of the switch and is adapted to generate a data transmitter output from a received digital network signal and couple the data transmitter output to the first input of the switch. The DAC is coupled to a second input of the switch and is adapted to generate a DAC output from the received digital network signal and couple the DAC output to the second input of the switch. The controller circuit is coupled to the switch and functions by configuring the switch for either efficient data transmission via the data transmitter, or conventional communication via the DAC.

17 Claims, 5 Drawing Sheets

METHOD AND SYSTEM FOR ACHIEVING FASTER ASYMMETRIC DATA TRANSMISSION THROUGH THE PUBLIC SWITCHED TELEPHONE NETWORK

FIELD OF THE INVENTION

The field of the present invention pertains to digital telecommunications. More particularly, the present invention relates to a method and system for achieving faster data transmission down loads from the public switched telephone network.

BACKGROUND OF THE INVENTION

Wide area networking across great distances is a new paradigm of operation for users of telecommunications equipment. The rise of the internet has led to an explosion in the amount of information available to individuals. Whole new industries have formed around the resulting near instantaneous access to information. Working professionals, governments, businesses, and other various segments of the economy are offering new forms of information, services, and products via the new forms of communication. The modern telecommunications devices, such as modems and network servers, allow many new forms of rich information content and are providing more efficient ways of organizing companies and business processes. Essentially, digital telecommunications has proven to be a far more powerful and compelling method of communication than previous, voice only, telecommunications methods. The rise of this new paradigm has led to a huge increase in the digital telecommunications appetite of the consumer.

The problem, however, is that the public switched telephone network through which the majority of this information passes was not designed to handle high bandwidth digital data. The public switched telephone network (PSTN) was primarily designed for point to point voice communication. To connect two users, the network establishes a communications channel between them. This communications channel typically is symmetrical, in that the data transfer rate "upstream" from a user is the same as the data transfer rate "downstream" to the user. Recently, the PSTN has been increasingly used for downloading large amounts of digital data. For voice communication or for relatively small data transfers (e.g., 14 to 33 Kbps), the PSTN functions adequately. For the rich, highly graphical data and modern client-server applications increasingly being used today, however, the PSTN is proving inadequate. Although the PSTN may be able to handle the demands of upstream communications traffic, the downstream traffic has become much greater than the communications channels of the PSTN can efficiently accommodate. Consequently, the vast majority of client server digital communications or high data rate downloads through the PSTN are inefficient and slow. Client-server communications tend to be asymmetric, meaning the largest data transfers are downstream data transfers from the server side of the communications channel (e.g., full motion video files, graphics files, 3D models, and the like) as opposed to the client side. Users are searching for faster connections which will allow them to efficiently download large amounts of digital information from the PSTN.

Prior Art FIG. 1 shows a diagram of a typical client-server communications channel 100 in the PSTN. The client-server communications channel 100 includes a user modem 101 sending transmit data and downloading receive data to and from a user on the left of FIG. 1 (not shown). User modem 101 is coupled to a 2–4 wire converter 102, and in turn, is coupled to a second 2–4 wire converter 103. In communications channel 100, the two wire line connecting 2–4 wire converter 102 and 2–4 wire converter 103 is referred to as the local loop. The 2–4 wire converter 103 is coupled to a PCM (pulse code modulation) codec 104. The 2–4 wire converter 103 and PCM codec 104 are often integrated into one piece of equipment referred to as a subscriber line interface card. PCM codec 104 is coupled to a digital switched network 105 portion of the PSTN, and in turn, is coupled to a internet service provider (ISP) server 106 via a digital subscriber line (e.g., T1 line).

The signals from the user on the left of FIG. 1 to PCM codec 104 are analog signals. The signals from the ISP server on the right of FIG. 1 to the digital switched network are digital signals. The analog signals are converted into corresponding digital signals by the digital to analog converters (DACs) and the analog to digital converters (ADCs) of PCM codec 104.

The 2–4 wire converter 103 and the PCM codec 104 comprise the major portions of a subscriber line interface card. The subscriber line interface card (SLIC) functions by converting the user's analog signal into a digital signal. Once converted, the digital signal is transmitted and switched through the digital switched network 105 of the PSTN. At the destination, the digital signal is coupled directly to ISP server 106 via the digital subscriber line without any intervening codecs.

User modem 101 is designed to receive analog signals. If the analog signal is a voice signal, it is used to drive the speaker of a telephone, recreating the user's voice. If the analog signal is a data signal (e.g., a V.21 modem signal), user modem 101 extracts the digital data from the analog signal for use by the receiving user's computer system. Hence, when ISP server 106 transmits large data files to the user, the digital signals comprising the data files are converted from digital form to analog form by PCM codec 104, transmitted across the local loop, and converted back to digital form by user modem 101. Communications channel 100 functions adequately when used to transmit and receive analog information (e.g., voice). However, communications channel 100 proves inefficient when utilized to transmit high bit rate data streams from ISP server 106.

One of the major bottle-necks to high speed data transmission through a communications channel is the presence of prior art SLICs. For example, one of the primary challenges in designing 56 Kbps PCM type modems is accounting for the detrimental effects of the DACs contained within the SLICs, in combination with the A or $\mu$ law expansion.

Prior Art FIG. 2 shows a typical prior art SLIC 200. SLIC 200 includes 2–4 wire converter 103 and PCM codec 104. PCM codec 104 includes an 8 bit A law ADC 201 and an 8 bit A law DAC 202. The 8 bit A law ADC 201 transmits information upstream to the digital switched network as a 64 Kbps digital data stream. The 8 bit A law DAC 202 receives downstream information as a 64 Kbps data stream. While SLIC 200 includes A law DAC 202 and A law ADC 201, those skilled in the art understand that alternatively, SLIC 200 could include a $\mu$ law DAC and $\mu$ law ADC instead.

As is well known in the art, in the down stream direction (e.g., from an internet service provider to a user), 8 bit A law DAC 202 restricts the number of signaling levels to a theoretical maximum of 256 voltage levels. The number of levels actually available are much lower. Many of the signaling levels around the origin are unusable primarily due to the A law expansion which places these levels too closely together. This forces the user modem 101 to use larger amplitude levels with a corresponding increase in the transmit signal power, as the bit rates increase. Thus, one of the factors limiting the maximum bit rate is the maximum allowable power levels on the local exchange lines. Those desiring more detailed information regarding A law and $\mu$ law codec standards are directed to "ITU-T G.711, PULSE CODE MODULATION (PCM) OF VOICE FREQUENCIES, International Telecommunications Union" which is incorporated herein as background material.

One solution presently available to the user is to convert to ISDN (integrated services digital network). However, this requires not only a hardware change to the SLIC 200 (e.g., the removal and replacement with a new SLIC) but software and other hardware changes to the PSTN such that the user's local loop is no longer viewed by the PSTN as a regular analog line. Furthermore, modification is often required to the subscriber's local loop on an ad-hoc basis to accommodate the wider bandwidth of an ISDN signal. Consequently, ISDN is presently an expensive option for the user. The installation expense is primarily due to the this lack of a simple, one time hardware change required within the PSTN and the running expense is due to the fact that an ISDN connection requires a total of 144 Kbps (e.g., basic ISDN 2B+D connection) in both directions, compared to only 64 Kbps full duplex for an analog line. Consequently, ISDN imposes more demands on the local exchange's limited available digital throughput to the next level of switching in the PSTN (e.g., digital switched network 105).

Therefore, the expansion of ISDN service at any local exchange has to be carefully planned by the PSTN operators to avoid degrading the quality of service to other normal users of that exchange. The solutions might mean limited ISDN availability and/or the expensive laying of new high bandwidth cable from the local exchange to the next switching level in the PSTN hierarchy. Neither of these solutions is desirable.

Thus, what is required is a system which improves the efficiency of asymmetric data transfers through the PSTN. The required system should improve the downstream data transfer bandwidth for users coupled to the PSTN. The required system should impose minimum changes to the hardware of the PSTN and should be relatively easy to implement in comparison to ISDN. The required system should increase the downstream data transfer efficiency of modems coupled to the PSTN. Additionally, the required system should be compatible with ordinary analog voice communication. The present invention provides a novel solution to the above requirements.

SUMMARY OF THE INVENTION

The present invention comprises a method and system which improves the efficiency of asymmetric data transfers through the PSTN. The system of the present invention includes a smart subscriber line interface card (SLIC). The SLIC of the present invention improves the downstream data transfer bandwidth for users coupled to the PSTN. The present invention imposes a minimal change to the hardware of the PSTN and is thus relatively easily implemented. The required system increases the downstream data transfer efficiency of modems coupled to the PSTN and is compatible with ordinary analog voice communication.

In one embodiment, the SLIC of the present invention includes a switch coupled to a data transmitter, a codec, and a controller circuit. The data transmitter is coupled to a first input of the switch. The data transmitter generates a data transmitter output from an incoming digital network signal and couples the data transmitter output to the first input of the switch. The codec is coupled to a second input of the switch. The codec generates a codec output from the incoming digital network signal and couples the second codec output to the second input of the switch. The controller circuit is coupled to the switch and functions by configuring the switch for either efficient data transmission or for conventional communication.

When configuring for efficient data communication, the controller circuit configures the switch to utilize the data transmitter for fast, efficient data downloads from the PSTN. In this configuration, data transfers from the user pass through the data transmitter and its associated 8 bit linear digital to analog converter. When configuring for conventional communication, the controller circuit configures the switch to utilize the codec. In this configuration, data transfers from the PSTN pass through the codec, and its associated 8 bit A law (or $\mu$ law) digital to analog converter, in the same manner as a conventional prior art SLIC.

Thus, the SLIC of the present invention increases the efficiency of modems coupled to the PSTN while maintaining compatibility with ordinary analog voice communication aspects of the PSTN. In so doing, the present invention improves the downstream data transfer bandwidth for users coupled to the PSTN while requiring a minimal change to the hardware of the PSTN.

BRIEF DESCRIPTION OF THE DRAWINGS

The present invention is illustrated by way of example and not by way of limitation, in the figures of the accompanying drawings and in which like reference numerals refer to similar elements and in which.

Prior Art

Prior Art

DETAILED DESCRIPTION OF THE INVENTION

In the following detailed description of the present invention, a method and system for achieving faster asymmetric data transmission through the public switch telephone network, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

The present invention comprises a smart subscriber line interface card (SLIC) which provides a method and system for achieving higher speed data transmission downloads from the PSTN. The SLIC of the present invention improves the effective downstream data transfer bandwidth for users coupled to the PSTN. The SLIC can be configured to operate in a conventional manner or to efficiently transfer data. In so doing, the SLIC of the present invention requires a minimum of change to the hardware of the PSTN and is thus relatively easily implemented. Hence, the SLIC of the present invention increases the download speed of suitable modems coupled to the PSTN and is compatible with ordinary analog voice communication. The present invention and its benefits are further described below.

Figure 1:
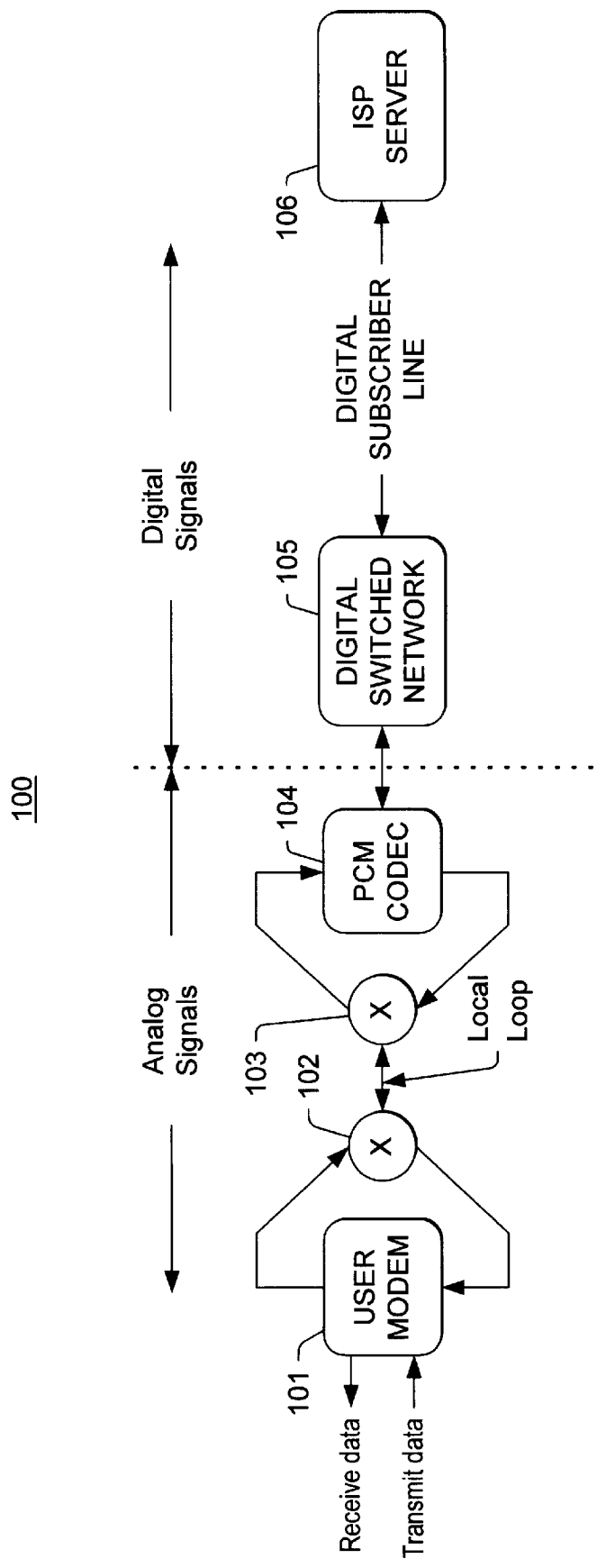
FIG. 1 shows a diagram of a typical communications channel in the public switched telephone network.
Figure 2:
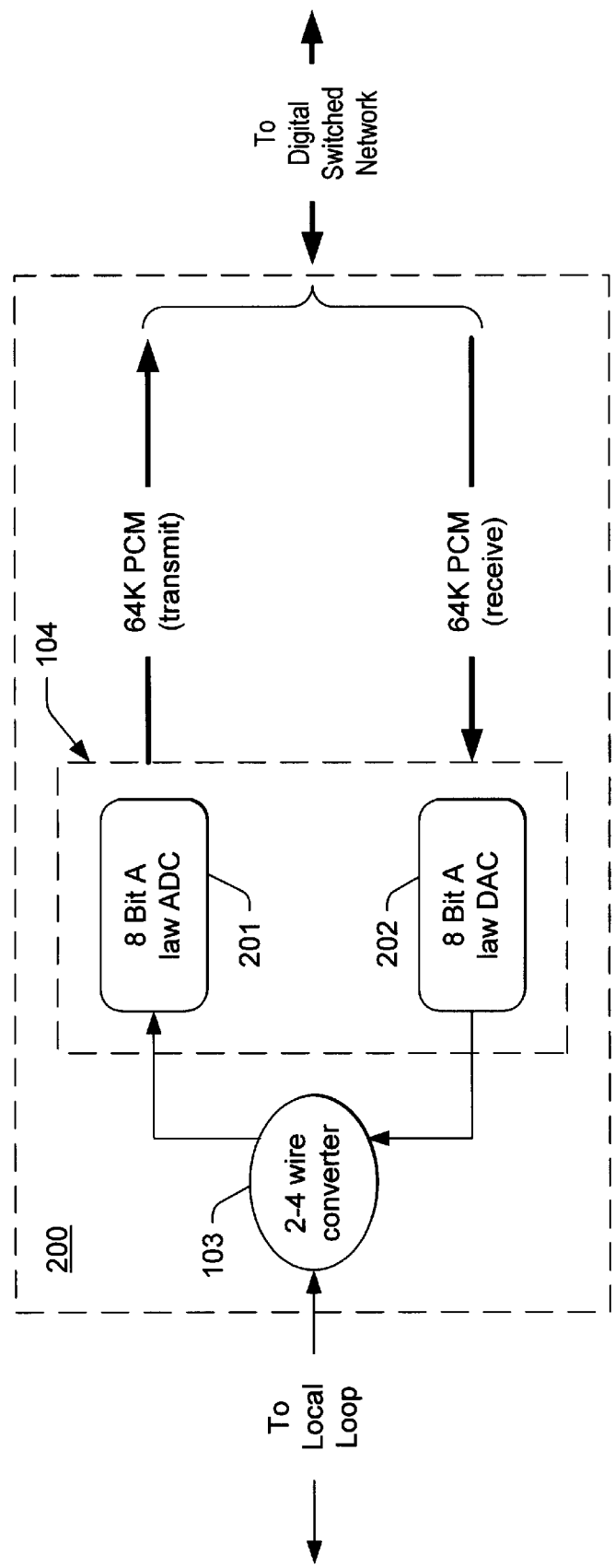
FIG. 2 shows a typical prior art subscriber line interface card.
Figure 3:
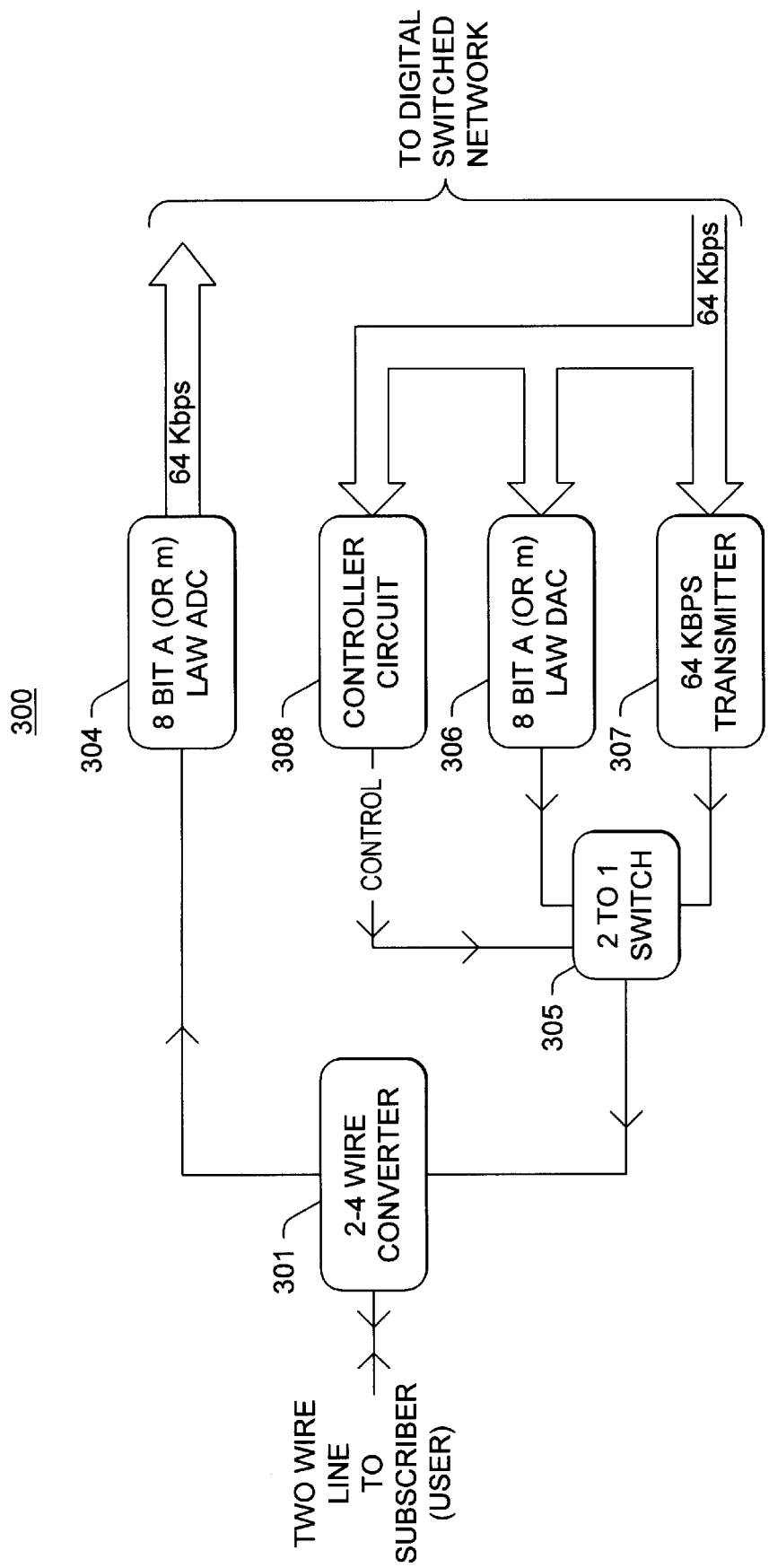
FIG. 3 shows a smart subscriber line interface card in accordance with one embodiment of the present invention.

FIG. 3 shows a smart SLIC 300 in accordance with one embodiment of the present invention. Smart SLIC (hereafter SLIC) 300 includes a 2–4 wire converter 301 coupled to an 8 bit A (or $\mu$) law ADC 304 and coupled to a 2 to 1 switch 305 (hereafter switch 305). Switch 305 is coupled to an 8 bit A (or $\mu$) law DAC 306 and a 64 Kbps transmitter 307. Both the 8 bit A (or $\mu$) law DAC 306 and the 64 Kbps transmitter 307 are coupled to receive a 64 Kbps digital network signal 312.

The 2–4 wire converter 301 is coupled via a two wire line to a subscriber (i.e., a user). The two wire line to the user carries full-duplex information to and from the user. The 2–4 wire converter 301 functions by converting the two wire line information (e.g., the information going to and coming from the user) into a separate one way user input signal and a separate one way user output signal. The user output signal is the information coming from the user to be transmitted out onto the digital switched network (e.g., the PSTN). The user input signal is the information coming from the digital switched network to be transmitted back to the user.

As the user sends information to be transmitted out across the digital switched network, the outgoing user output signal is coupled to 8 bit A (or $\mu$) law ADC 304. The 8 bit A (or $\mu$) law ADC 304 converts the analog user output signal into a digital 64 Kbps PCM signal and transmits it out to the digital switched network portion of the PSTN.

When information is received from the digital switched network to be transmitted to the user, the information is received as a 64 Kbps digital network signal at both the 8 bit A (or $\mu$) law DAC 306 and the 64 Kbps transmitter 307. When SLIC 300 is configured for efficient data transmission, the 64 Kbps transmitter 307 output is coupled to the 2–4 wire converter 301 by switch 305. When SLIC 300 is configured for conventional communication, the 8 bit A (or $\mu$) law DAC 306 output is coupled to the 2–4 wire converter 301. The resulting user input signal (e.g., either the DAC 306 output or the 64 Kbps transmitter 307 output) is coupled to the user via the 2–4 converter 301 and the two wire line.

Referring still to FIG. 3, SLIC 300 of the present invention also includes a controller circuit 308. Controller circuit 308 is coupled to the same 64 Kbps digital network signal as the 8 bit A (or $\mu$) law DAC 306 and the 64 Kbps data transmitter. In the present embodiment, controller circuit 308 receives configuration instructions from the 64 Kbps digital network signal. Controller circuit 308 controls switch 305 to configure switch 305 for either efficient data transmission or conventional communication.

To configure SLIC 300 of the present invention for efficient data transmission, controller circuit 308 configures switch 305 to couple the output of 64 Kbps transmitter 307 to the 2–4 wire converter 301. This "switches out" the 8 bit A (or $\mu$) law DAC 306. The 64 Kbps digital network signal is processed by 64 Kbps transmitter 307 such that the full 256 theoretical voltage levels are available. The 64 Kbps transmitter 307 output is coupled to 2–4 wire converter 301 via switch 305, and is subsequently coupled via the two wire line to the user. This enables the user to obtain the full 64 Kbps data transmission download speed possible with the 64 Kbps digital network signal. The upstream data transfers still pass through 8 bit A (or $\mu$) law ADC 304 and are thus limited to conventional data transfer rates (e.g., V.34 33.6 Kbps).

64 Kbps transmitter 307 is designed to effectively utilize the 64 Kbps bandwidth to and from the digital switched network. 64 Kbps transmitter 307 performs a linear 8 bit digital to analog conversion as opposed to a logarithmic A law or $\mu$ law digital to analog conversion. This eliminates the limitations of 8 bit A (or $\mu$) law DAC 306, thereby allowing the user to receive downstream communications at the full 64 Kbps rate. Many new data transmission schemes are now made possible by this method. The various schemes can be implemented, for example, by modifying the characteristics of 64 Kbps transmitter 307 in conjunction with new telecommunications equipment utilized by the user.

To configure SLIC 300 of the present invention for conventional communications, 8 bit A (or $\mu$) law DAC 306 is switched back into the user's communications path. Controller circuit 308 configures switch 305 to select the output of 8 bit A (or $\mu$) law DAC 306. This configuration causes SLIC 300 to function as a conventional prior art SLIC. The limitations of 8 bit A (or $\mu$) law ADC 304 and 8 bit A (or $\mu$) law DAC 306 are both within the user's communications path. The SLIC behaves as if it were a standard prior art SLIC. This ensures compatibility with prior art voice communication and prior art modem communication (e.g., V. 32 and V.34 industry standard protocols).

It should be appreciated 8 bit A (or $\mu$) law DAC 306 can be either "A law" or "$\mu$ law" based. A law codecs are standard in some countries (e.g., the United States) and $\mu$ law codecs are standard in others (e.g., Europe). The present invention is readily suited to functioning with to either standard.

It should be appreciated that 64 Kbps transmitter 307 performs a linear 8 bit digital to analog conversion as opposed to a logarithmic A law or $\mu$ law digital to analog conversion. However, this conversion could also be a smaller 4 bit or 2 bit linear conversion, or simply a 1 bit local loop line driver. This flexibility allows the design of much simpler and much more robust forms of downstream digital transmission. For example, the 8 bit words (or octets) streaming serially from the server can be coded as two 4 bit groups, which gives a 16 level PAM signal a with 64 Kbps data rate and a 16 KHz symbol rate; or, they can be coded as four 2 bit groups which gives a 4 level pulse amplitude modulation signal with a 64 Kbps data rate and 32 KHz symbol rate; or they can be coded as individual bits which gives 2 level (binary) transmission at 64 Kbps data rate and 64 KHz symbol rate. This final binary example requires only the use of a line driver within the SLIC 300 for downstream data transmission. Such modems as these are much more robust than the prior art PCM type modems which use the conventional prior art SLIC because they use a much smaller number of signaling levels. The smaller number of signaling levels leads to much better noise performance. These modems accomplish this by exploiting the wider bandwidth of the local loop in a manner in which the prior art PCM type modems do not. However, the downside to these higher symbol rate approaches is also one of the disadvantages attributed to ISDN implementation, namely, the possibility that some modifications may be necessary to the local loop to support theses wider bandwidth signals, increasing the installation expense.

Referring still to FIG. 3, in the present embodiment, the configuration and function of SLIC 300 is controlled by the server. Controller circuit 308 is coupled to the server via the 64 Kbps digital network signal from the digital switched network. The server (e.g., ISP server, remote access server, or the like) switches SLIC 300 into its "efficient data transmission mode" by sending a unique control word down the 64 Kbps digital network stream. This unique control word indicates to controller 308 that the user is equipped with technology compatible with the efficient data transmission mode of the present invention and causes controller circuit 308 to appropriately configure SLIC 300. The controller leaves SLIC 300 in a "default" conventional mode until it receives the appropriate instructions. Thus, for example, if the user is not properly equipped, or if the information coming from the digital switched network is simple digitized voice information, SLIC 300 remains in the default conventional mode. Consequently, in the present embodiment, SLIC 300 configuration is controlled from the server end.

Thus, the SLIC 300 of the present invention can function as a simple one for one replacement for a conventional prior art SLIC. For example, a technician from a phone company can install the system of the present invention by simply pulling the prior art SLIC from the local exchange and installing the SLIC 300 in its place. No further changes to the PSTN would be required. Unlike ISDN, for example, SLIC 300 requires the same 64 Kbps of data as a regular, unmodified analog phone line.

Figure 4:
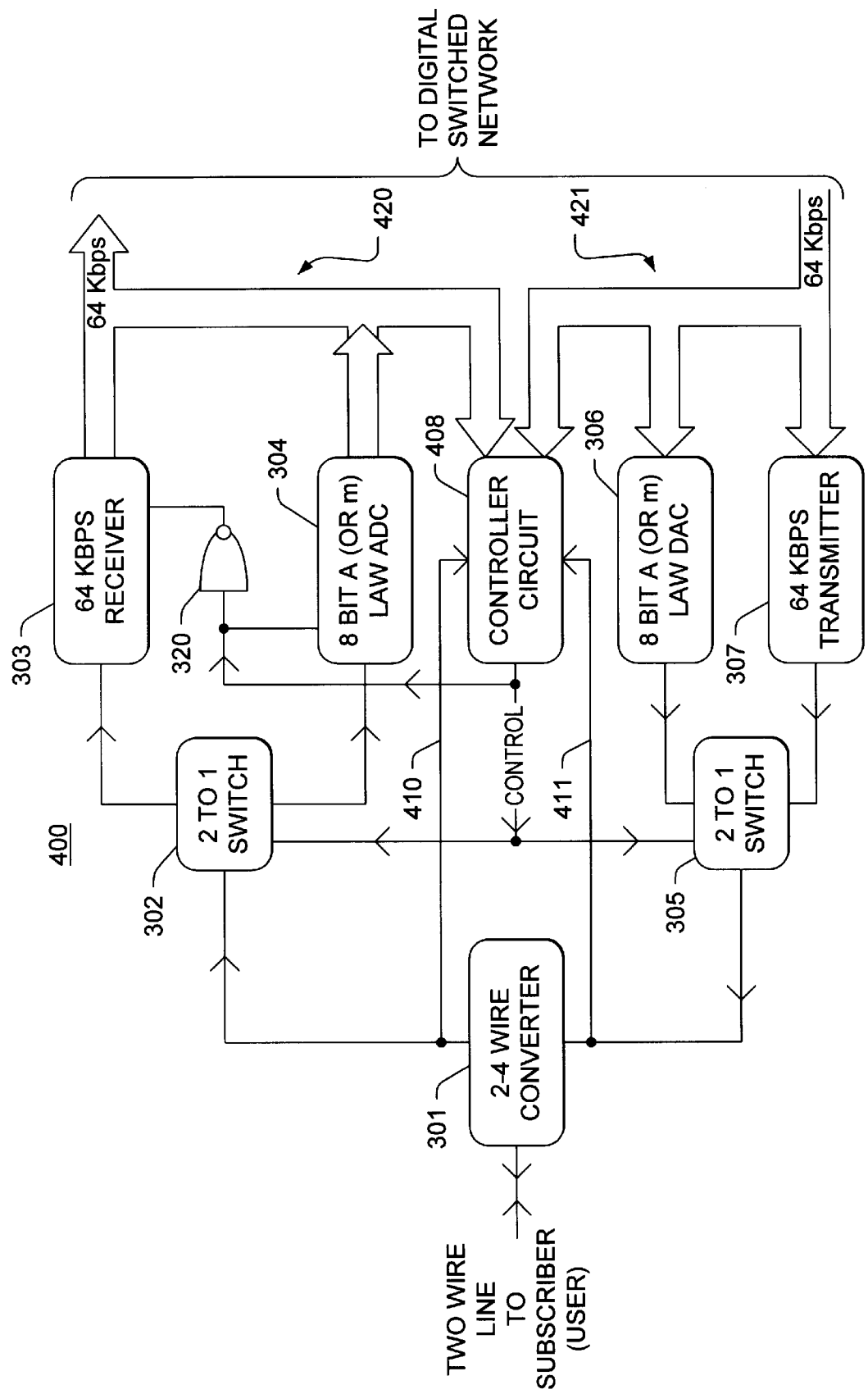
FIG. 4 shows a subscriber line interface card in accordance with a more versatile and more complex embodiment of the system of the present invention.

Referring now to FIG. 4, a SLIC 400 in accordance with a more complex, more versatile embodiment of the system of the present invention is shown. SLIC 400 is similar to SLIC 300 in composition and operation, except that SLIC 400 provides for efficient data transmission is both the upstream and downstream directions and provides for configuration from the user end and the server end. In the present embodiment, SLIC 400 includes a controller circuit 408, as opposed to the controller circuit 308 of SLIC 300. Controller circuit 408 is coupled to the two wire line to the user via lines 410, 411, and the 2–4 wire converter 301. In addition, SLIC 400 includes 2 to 1 switch 302 (hereafter switch 302), 64 Kbps receiver 303, 8 bit A (or μ) law ADC 304, and an inverter 320.

To configure SLIC 400 of the present invention for efficient data transmission, controller circuit 408 configures switch 302 to couple the user input signal to 64 Kbps receiver 303 and enables the output of 64 Kbps receiver 303 via inverter 320, while tri-stating the output of 8 bit A (or μ) law ADC 304. Similarly, controller circuit 308 switches out 8 bit A (or μ) law DAC 306 by configuring switch 305 to couple the output of 64 Kbps transmitter 307 to the 2–4 wire converter 301.

This configuration effectively switches out 8 bit A (or μ) law ADC 304 and 8 bit A (or μ) law DAC 306 from the communications path of the user. 64 Kbps receiver 303 and 64 Kbps transmitter 307 are designed to effectively utilize the 64 Kbps bandwidth to and from the digital switched network. This eliminates the limitations of 8 bit A (or μ) law DAC 306 and 8 bit A (or μ) law ADC 304, thereby allowing the user to communicate upstream at the full 64 Kbps rate and download from the digital switched network at the full 64 Kbps rate.

To configure SLIC 400 of the present invention for conventional communications, 8 bit A (or μ) law ADC 304 and 8 bit A (or μ) law DAC 306 are switched back into the user's communications path. Controller circuit 408 configures switch 302 and switch 305 to select 8 bit A (or μ) law ADC 304 and 8 bit A (or μ) law DAC 306 respectively. Controller circuit 308 also enables the output of 8 bit A (or μ) law ADC 304 while tri-stating the output of 64 Kbps receiver 303.

This configuration causes SLIC 300 to function as a conventional prior art SLIC. The limitations of 8 bit A (or μ) law ADC 304 and 8 bit A (or μ) law DAC 306 are present. The SLIC behaves as if it were a standard prior art SLIC. This ensures compatibility with prior art voice communication and prior art modem communication (e.g., V. 32 and V. 34 industry standard protocols).

SLIC 400 can be switched into the efficient data transmission mode from the user end via instructions received via line 410. Additionally, SLIC 400 can be switched into efficient data transmission mode from the server end. Line 411 couples configuration instructions received from the digital switched network to controller circuit 408, while line 410 couples configuration instructions received from the user end. In this manner, controller circuit 408 can configure SLIC 400 in response to instructions received from the user or instructions received from a resource on the PSTN (e.g., a server coupled to the PSTN via a T-1 line).

In addition, SLIC 400 can be switched directly from digital instructions transmitted onto or received from the digital switched network in the same manner as SLIC 300. Controller circuit 408 is coupled to 64 Kbps streams 420 and 421. These streams carry information in a digital form. In contrast, lines 410 and 411 carry information in an analog form (e.g., V.21 signals). By receiving the 64 Kbps streams 420 and 421, controller circuit 408 can immediately recognize digital configuration instructions (e.g., unique digital words).

The modifications included within SLIC 400 allow the implementation of additional configuration and data transmission schemes. SLIC 400 can be configured from the user end or the digital switched network end (e.g., the server end). The configuration instructions can be fully digital or analog. Hence, SLIC 400 provides a more versatile implementation of the system of the present invention while SLIC 300 provides a streamlined, less complex implementation.

Figure 5:
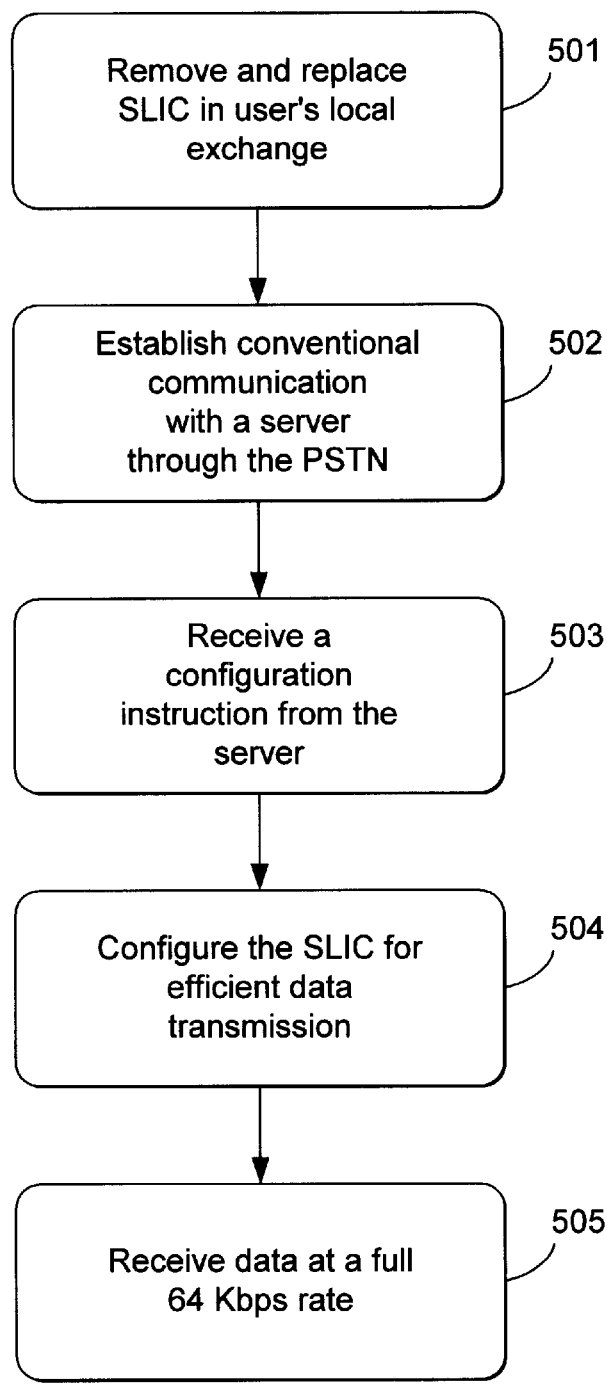
FIG. 5 shows a flow chart of the steps of a process in accordance with one embodiment of the present invention.

Referring now to FIG. 5, a flow chart of the steps of a process 500 in accordance with one embodiment of the present invention is shown. Process 500 is the case where a user of a modem in accordance with the present invention communicates with a similarly equipped user. The users transmit and receive data at the full 64 Kbps rate supported by the SLIC of the present invention (e.g., SLIC 300), through the regular PSTN.

Process 500 begins in step 501 where a prior art SLIC in a local exchange is replaced with a SLIC in accordance with the present invention. As described above, the SLIC of the present invention is a pin for pin replacement for the prior art SLIC. After the prior art SLIC is removed and replaced, no further changes to the PSTN hardware or software are required.

In step 502, conventional communications are established with a server via the PSTN. The user is coupled to the PSTN through a SLIC in accordance with the present invention. The server (e.g., an ISP server) is coupled to the PSTN via a direct digital connection. The user initiates a normal analog communications channel with the server. This initial communication follows the standard V.21 protocols.

In step 503, the SLIC receives a configuration instruction from the server. As described above, the configuration instruction is coupled to the SLIC via the 64 Kbps digital network signal from the digital switched network portion of the PSTN. This instruction causes a controller circuit within the SLIC to configure the SLIC for efficient data transmission. The configuration instruction is comprised of, for example, a unique digital word. The configuration instruction is transmitted by the server and is recognized by the SLIC of the present invention.

In step 504, the SLIC is configured for efficient data transmission. The controller circuit within the SLIC switches out the A law (or μ law) DAC and switches in the 64 Kbps transmitter. The SLIC is now configured for 64 Kbps downstream data transfers.

In step 505, the user receives data at 64 Kbps. The user's modem has been transformed from a conventional modem (e.g., V.21 modem) into 64 Kbps asymmetric digital modem by the system of the present invention. The limitations of the A law (or μ) DAC in the SLIC is bypassed. 64 Kbps downstream communication can now take place between the users. Upstream communication takes place at conventional speeds.

Thus, the present invention provides a method and system which improves the efficiency of asymmetric data transfers through the PSTN. The SLIC of the present invention improves the downstream data transfer bandwidth for users coupled to the PSTN. The present invention imposes a minimal change to the hardware of the PSTN and is thus relatively easily implemented. The required system increases the downstream data transfer efficiency of modems coupled to the PSTN and is compatible with ordinary analog voice communication.

The present invention, a method and system for achieving improved data transmission through the public switched telephone network, is thus disclosed. While the present invention has been described in particular embodiments, it should be appreciated that the present invention should not be construed as limited by such embodiments, but rather construed according to the below claims.

What is claimed is:

1. A subscriber line interface card for enhanced asymmetric data communication across the public switched telephone network, comprising:
    a switch having an output and a first input and a second input, the switch adapted to transmit a user input signal from the output, the user input signal received via the first input or the second input;
    a data transmitter coupled to the first input of the switch, the data transmitter adapted to generate a data transmitter output from a received digital network signal and couple the data transmitter output to the first input of the switch;
    a DAC (digital to analog converter) coupled to the second input of the switch, the DAC adapted to generate a DAC output from the received digital network signal and couple the DAC output to the second input of the switch; and
    a controller circuit coupled to the switch, the controller circuit adapted to configure the switch for efficient data transmission via the data transmitter, or configure the switch for conventional communication via the DAC.

2. The subscriber line interface card from claim 1 wherein the data transmitter further includes a 64 Kbps data transmitter adapted to receive a 64 Kbps data stream from the public switched telephone network and generate the data transmitter output therefrom.

3. The subscriber line interface card from claim 2 wherein the 64 Kbps data transmitter further includes an 8 bit linear digital to analog converter adapted to generate the data transmitter output.

4. The subscriber line interface card from claim 1 wherein the DAC further comprises either an 8 bit A law DAC adapted to generate the DAC output, or an 8 bit μ law DAC adapted to generate the DAC output.

5. The subscriber line interface card from claim 1 wherein the controller circuit causes the switch to switch out the DAC to configure the subscriber line interface card for efficient data transmission.

6. The subscriber line interface card from claim 1 wherein the controller circuit causes the switch to switch out the data transmitter to configure the subscriber line interface card for conventional communication.

7. The subscriber line interface card from claim 1 wherein the controller circuit is adapted to receive a configuration instruction from a user end of the subscriber interface card.

8. The subscriber line interface card from claim 1 wherein the controller circuit is adapt ed to receive a configuration instruction from either a user end or a digital switched network end of the subscriber interface card.

9. A subscriber line interface card for providing higher speed data downloads from the public switched telephone network, comprising:
    a data transmitter adapted to generate a data transmitter output from a received digital network signal and couple the data transmitter output to the user;
    a DAC (digital to analog converter) adapted to generate a DAC output from the received digital network signal and couple the DAC output to the user;
    a switch coupled to the data transmitter and the DAC, the switch adapted to transmit either the data transmitter output or the DAC output to the user; and
    a controller circuit coupled to the switch and adapted to configure the data transmitter for efficient data transmission by coupling the data transmitter output to the user, the controller circuit further adapted to configure the DAC for conventional communication by coupling the DAC output to the user, the controller circuit further adapted to configure the switch for efficient data transmission and reception by transmitting data via the data transmitter, or for conventional communication by transmitting data via the DAC.

10. The subscriber line interface card from claim 9 wherein the data transmitter further includes a 64 Kbps data transmitter adapted to receive a 64 Kbps data stream from the public switched telephone network and generate the data transmitter output therefrom.

11. The subscriber line interface card from claim 9 wherein the DAC comprises either an 8 bit A law DAC adapted to generate the DAC output, or an 8 bit μ law DAC adapted to generate the DAC output.

12. The subscriber line interface card from claim 9 wherein the controller circuit configures the switch to switch out the DAC to configure the subscriber line interface card for efficient data transmission.

13. The subscriber line interface card from claim 9 wherein the controller circuit configures the switch to switch out the data transmitter to configure the subscriber line interface card for conventional communication.

14. The subscriber line interface card from claim 9 wherein the controller circuit is adapted to receive a configuration instruction from a user end of the subscriber interface card.

15. The subscriber line interface card from claim 9 wherein the controller circuit is adapted to receive a configuration instruction from either a user end or a digital switched network end of the subscriber interface card.

16. A method for providing high speed asymmetric data transfers across the public switched telephone network with a subscriber line interface card comprising a data transmitter, a digital to analog converter (DAC), and a switch operatively coupled to the data transmitter and to the DAC, the method comprising the steps of:
    (a) receiving a digital network signal at the data transmitter;

(b) receiving the digital network signal at the DAC;
(c) generating a data transmitter output from the received digital network signal;
(d) generating a DAC output from the received digital network signal;
(e) configuring the switch for efficient data transmission via the data transmitter to thereby couple the data transmitter output to a user; and
(f) configuring the switch for conventional communication via the DAC to thereby couple the DAC output to the user.

17. A method according to claim 16, wherein:
the subscriber line interface card further comprises a controller circuit configured to receive the digital network signal and to control the switch;
the method further comprises the step of receiving, by the controller circuit, configuration instructions from the digital network signal; and
the configuring step (e) is performed in response to the configuration instructions.

* * * * *